Nov. 19, 1935.  R. B. LUKER  2,021,733

LIFTING MEANS ATTACHMENT FOR AUTOMOBILES

Filed Sept. 10, 1934  3 Sheets-Sheet 1

Inventor:
Robert B. Luker,
By W. W. Williamson
Attorney.

Nov. 19, 1935.   R. B. LUKER   2,021,733
LIFTING MEANS ATTACHMENT FOR AUTOMOBILES
Filed Sept. 10, 1934   3 Sheets-Sheet 3

Inventor:
Robert B. Luker,
By W.W.Williamson
Attorney.

Patented Nov. 19, 1935

2,021,733

UNITED STATES PATENT OFFICE 2,021,733

LIFTING MEANS ATTACHMENT FOR AUTOMOBILES

Robert B. Luker, Gloucester, N. J.

Application September 10, 1934, Serial No. 743,341

3 Claims. (Cl. 254—86)

My invention relates to new and useful improvements in lifting means attachment for automobiles and has for one of its objects to provide mechanically operated means to force fluid into one or more hydraulic jacks for raising one or more of the wheels from the ground.

Another object of my invention is to construct a rugged lifting means employing the motor of an automobile to actuate mechanism which in turn functions to hydraulically operate jacks for lifting the automobile.

Another object of the present invention is to provide a mechanico-hydraulic lifting means for an automobile wherein mechanical means are employed for some of the functions and hydraulic means used for other of the functions.

Another object of the invention is to provide hydraulic lifting means at each end of an automobile and to independently connect them with a fluid reservoir or cylinder having a piston therein to force the fluid into the lifting means and withdraw said fluid therefrom to retract the lifting means.

Another object of the invention is to provide means for actuating the piston from the motor or power plant of the automobile.

Another object of the invention is to provide a unique mechanism for transmitting forward and reverse motions from the motor or power plant of the automobile to the piston.

Another object of this invention is to provide a nest of gears, two of which can be selectively meshed with a gear connected to the power plant, for driving the main gear of the nest in either direction.

Another object of the invention is to mount the nest of gears on a pivoted frame which is operable from a location within easy access of the automobile operator.

Another object of the invention is to provide means for automatically moving the nest of gears to a neutral position when the piston has reached the limit of its return stroke.

Another object of the invention is to provide means to indicate when any or all of the lifting means or jacks have been operated to an extent that the wheel or wheels are off the ground. Such indicating means preferably consists of a pressure gage located adjacent the operator's position and connected with the cylinder.

A further object of the invention is to provide a signal for indicating when the lifting means is in a full retracted position and when said lifting means has been initially moved from the retracted position.

A still further object of the invention is to provide a latch for holding the lifting means in a full retracted position, which latch can be utilized as a portion of the signal.

With these and other objects in view, this invention consists of the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Figure 1:
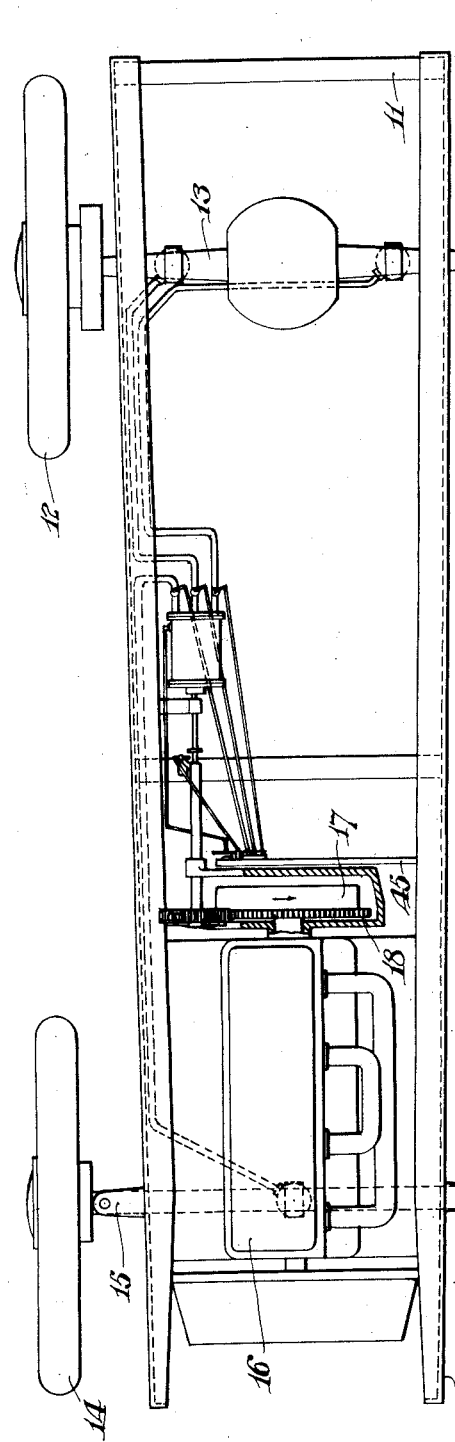
Fig. 1 is a view in plan of a conventional automobile chassis illustrating an application of my invention.
Figure 2:
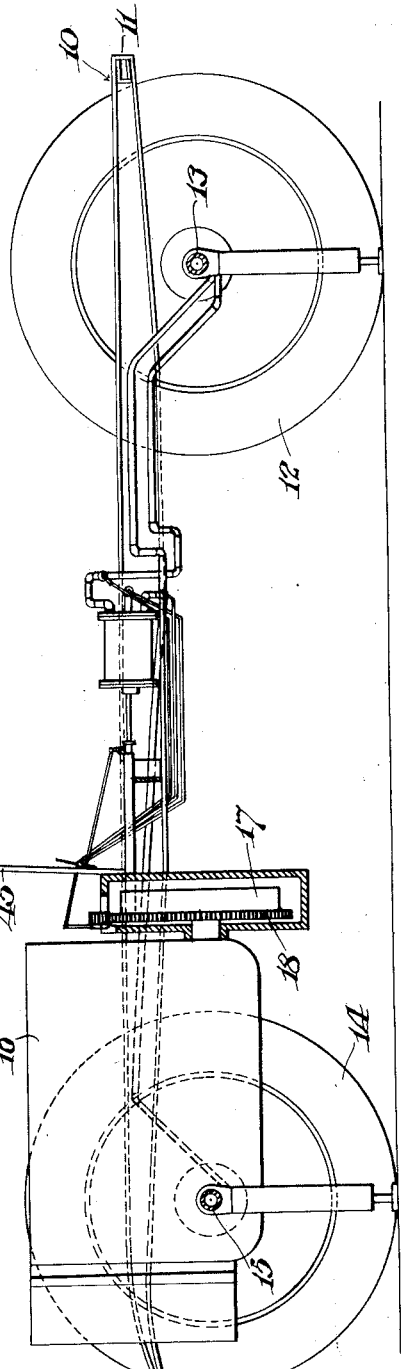
Fig. 2 is a longitudinal sectional view of Fig. 1.
Figure 3:
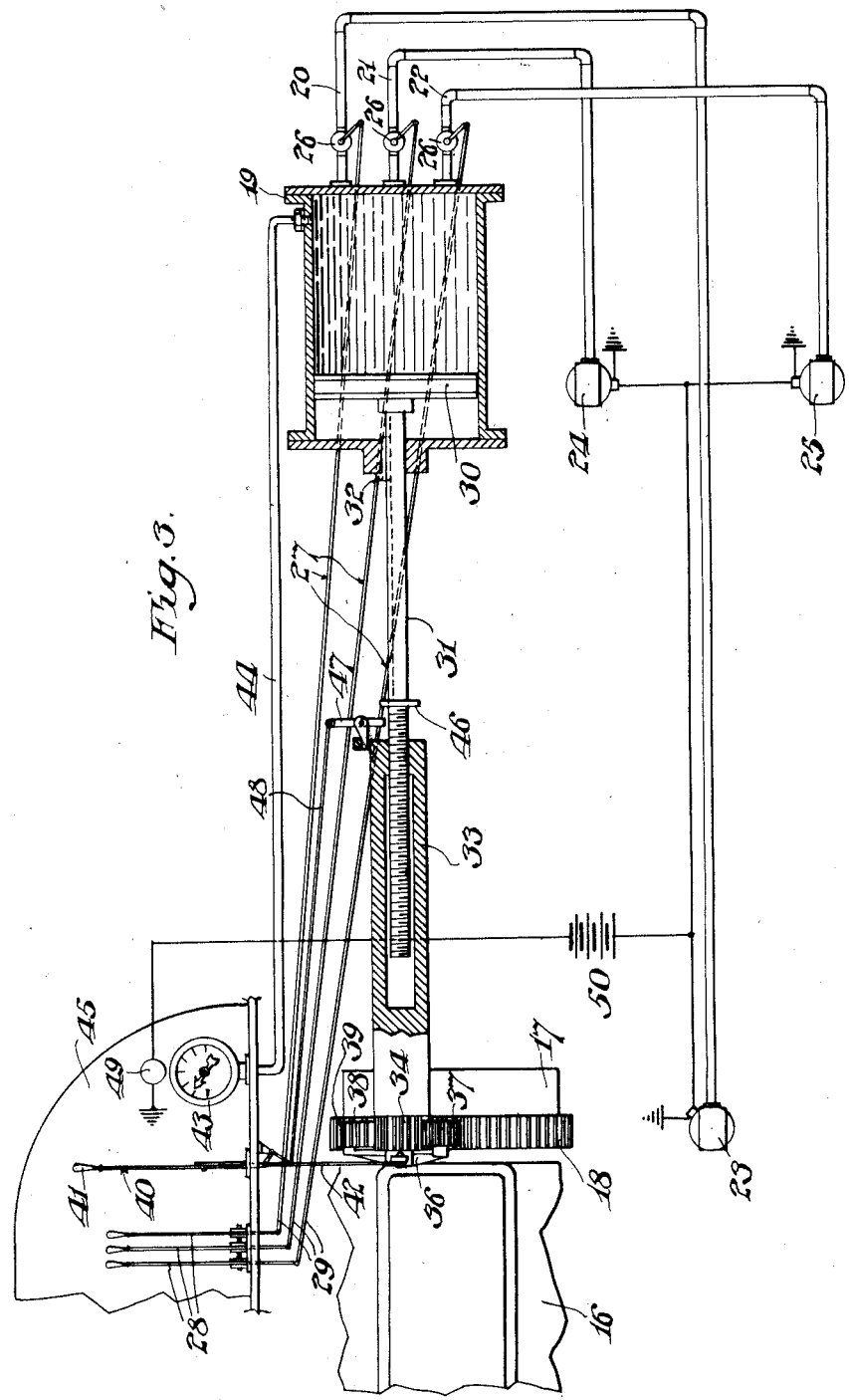
Fig. 3 is an enlarged fragmentary sectional elevation of the main elements of the invention illustrated diagrammatically to show the general relation of the several parts.
Figure 4:
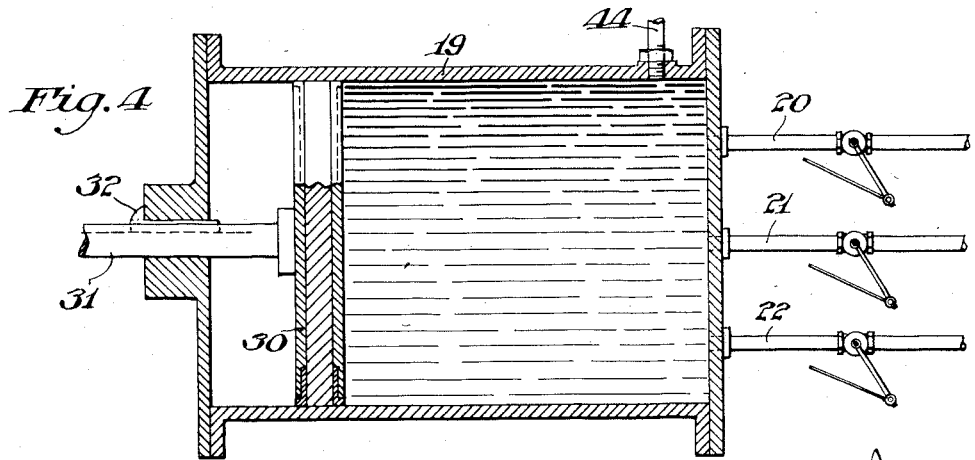
Fig. 4 is a further enlarged detail sectional view of the cylinder with some of the parts shown in elevation.
Figure 5:
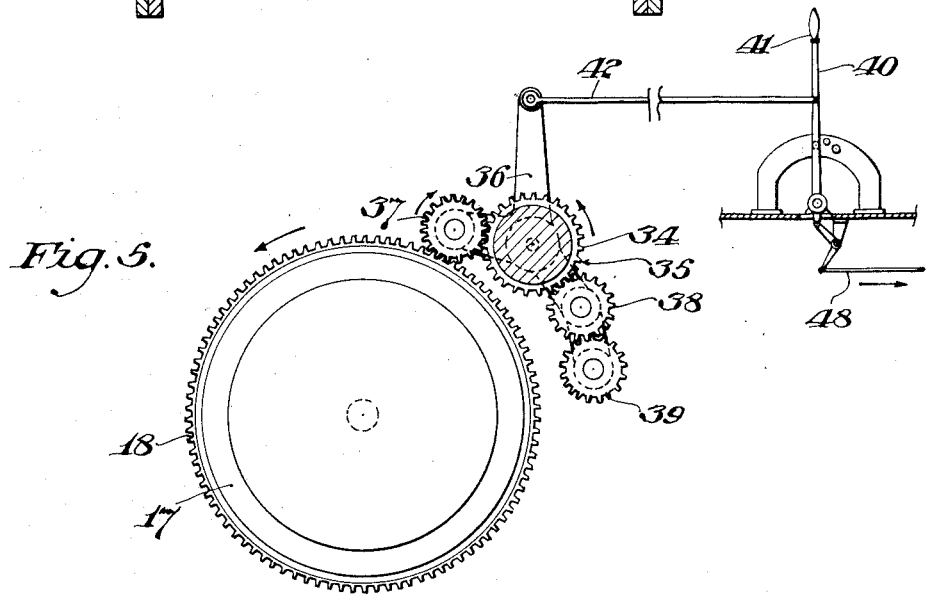
Fig. 5 is a view illustrating the relation of the nest of gears and its supporting frame to the gear of the power plant.

In carrying out my invention as herein embodied 10 represents a conventional automobile chassis including a frame 11, rear or driving wheels 12 suitably mounted on an axle 13, front wheels 14, connected in the usual manner with the front axle 15, and a power plant, motor or prime mover 16 including a fly wheel 17. Connected with the motor 16 is a gear wheel 18 which may be formed on the fly wheel 17 as is usual.

A fluid reservoir or cylinder 19 is suitably located and mounted in the automobile or on its chassis and from one end thereof lead a number of conduits, herein shown as three, 20, 21 and 22 to the lifting means or jacks 23, 24 and 25 respectively whereby fluid in the cylinder can be conveyed back and forth between said cylinder and any or all of the lifting means.

In order to selectively control the admission of fluid to the lifting means, each of the conduits has a valve 26 therein operated by any suitable means 27, herein shown for purposes of illustration as comprising levers 28 located adjacent the automobile operator's position and connected by rods 29 with the handles of the valves.

Within the cylinder is slidably mounted a piston 30 provided with a piston rod 31, splined as at 32 to permit said rod to slide longitudinally while preventing a rotation thereof. A portion of the outer end of said piston rod 31 has a screw thread thereon for threaded connection with the shaft 33 which has a socket to receive the threaded end of the piston rod.

The shaft 33 is suitably journalled and has the main gear 34 of the nest of gears 35, fixed thereto. A frame 36 is pivoted to rotate on the axis of said shaft and carries trunnions on which are journalled a gear 37 meshing with the main gear 34, an idler gear 38 also meshing with said main gear 34 and another gear 39 meshing with the idler gear. The gears 37 and 39 can be selectively caused to mesh with the gear wheel 18 of the power plant 16 by swinging the frame 36 in the proper direction through the medium of a suitable manually actuated operating means 40 which, for purposes of illustration, is shown as including a lever 41 located adjacent the operator's position and connected by a rod 42 with the frame 36.

When the automobile motor or power plant 16 is in operation and the gear 37 is in mesh with the gear wheel 18, the main gear 34 will be revolved in the proper direction to cause the piston 30 to go in the direction which will force some of the fluid from the cylinder into any conduit whose valve is open and thence into a connected lifting means or jack for actuating the same. In order to indicate when the wheel or wheels of the automobile are off the ground, a suitable indicating means 43 is made use of and as herein shown this means comprises a pressure gage located adjacent the operator's position, as on the automobile dash or instrument board 45, connected by a conduit 44 with the cylinder 19. At the time a predetermined pressure is indicated on the gage 43 it will be apparent to the operator that the lifting means has raised a wheel or wheels off the ground.

To lower the automobile, the frame 36 is swung in the direction which will cause the gear 39 to mesh with the gear wheel 18 and thus reverse the direction of rotation of the main gear 34. This will reverse the movement of the piston and cause it to draw the fluid back into the cylinder thus retracting the lifting means.

As the piston 30 is moved back, a trip 46, on the piston rod 31 will engage a trip lever 47 suitably mounted in the path of travel of the trip and thereby actuate said trip lever, to which is attached one end of a connecting rod 48, the latter also being connected with the frame 36 or its operating mechanism, so that said frame will be swung into a neutral position and the piston will be stopped.

A signal 49, preferably of the visible variety, is also located adjacent the automobile operator's position, as on the dash or instrument board 45, and it is illustrated as mounted in proximity to the pressure gage 43 and might be in or on the gage casing. In the present instance this signal is shown as an electric lamp in an electric circuit including a source of current 50, a fixed contact 51 mounted upon but insulated from a stationary part of any or all of the lifting means or jacks, and a movable or spring contact 52 mounted for co-action with the fixed contact whereby they function as a switch to make and break the electric circuit. The movable contact 52 has its end positioned in the path of travel of a movable element of the lifting means, such as the base 53 so as to be actuated by such movable element for opening the electrical circuit and permitting it to close such circuit.

The lower or free end of the movable contact 52 is provided with a nose 54 or hook to engage beneath the movable element of the lifting means and thus retain said lifting means in a retracted position against accidental displacement, wherefore said movable contact 52 serves a two-fold purpose, viz, it acts as an electrical switch and functions to retain the lifting means retracted.

Figure 6:
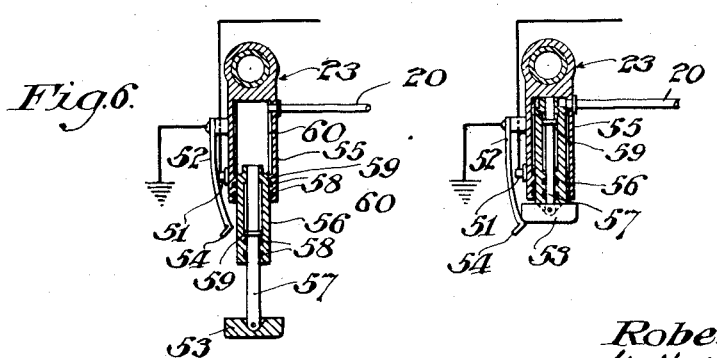
Fig. 6 is a vertical sectional view of a lifting means or jack showing it in an extended position and diagrammatically illustrating electrical connections for the signal.
Figure 7:
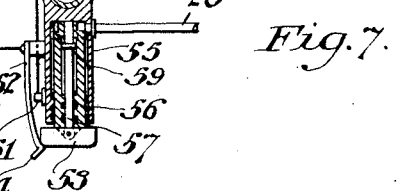
Fig. 7 is a similar view showing the lifting means in a retracted position.

The lifting means or hydraulic jack 23 may be of any suitable construction, but for purposes of illustration I have shown a satisfactory structure of this character in detail, in Figs. 6 and 7. Each lifting means unit or jack includes a cylinder 55 closed at its upper end and fixed in a substantially vertical position to some part of the vehicle, as to an axle thereof, while the lower end of said cylinder is open. Telescoping in the cylinder 55 is a sleeve piston 56 and telescoping in said sleeve piston is an elongated piston or rod 57 to which the base 53 is adjustably fastened. The telescoping parts are packed, as to 58, to prevent leakage of the fluid and said parts are also provided with splines 59 and grooves 60 to limit the outward movements of said telescoping parts.

Fluid entering the upper portion of the interior of the cylinder 55 of the lifting means, will act upon the inner end of the sleeve piston 56 and force it outward or downward and just after it has started to move the fluid will act upon the elongated piston or rod 57 to force it outward or downward.

These movements will disengage the retained parts, particularly the base 53, from the nose 54 and permit the base to rest upon the surface supporting the vehicle. The continued supply of fluid to the lifting means will now cause the cylinder 55 of the lifting means and sleeve piston to move upward relative to the elongated piston and thereby raise the vehicle or some part thereof until a wheel or wheels are lifted off the supporting surface.

As the retained parts of the lifting means are disengaged from the hook 54, the spring contact 52 will strike against the stationary contact 51 and close the circuit to light the lamp 45 thereby indicating that the lifting means is being operated. When the lifting means is retracted, the circuit will be opened and the light will be extinguished.

From the foregoing it will be apparent that when it is necessary or desirable to lift the automobile, or to lift a wheel off the ground, any number of the levers 28 are actuated in the proper direction to open the desired valves 26. Assuming that the lever for the valve in conduit 20 is operated, then such valve will be opened, placing the lifting means 23 in communication with the fluid reservoir or cylinder 19. The lever 41 is then actuated to cause the gear 37 to mesh with the gear wheel 18 so that motion will be transmitted from the power plant or motor of the automobile, through gear wheel 18, gear 37, main gear 34, shaft 33 and piston rod 31 to the piston 30. This will move the piston 30 outward and force the fluid from the cylinder 19, through the conduit 20 into the lifting means 23 and raise that part of the automobile to which said lifting means is connected. By observing the pressure gage 43, the operator can ascertain when the lifting means is fully extended due to the indicated pressure which has been predetermined. As soon as the vehicle is raised the valve 26 in conduit 20 is closed and the frame 36 moved to a neutral position to stop further operation of the piston 30.

To retract the lifting means, the frame 36 is moved in the proper direction to cause the gear 39 to mesh with the gear wheel 18 and because of the intermediate or idler gear 38 the operations will be reversed and the piston moved inward. This will produce a suction action within the cylinder 30 and return the fluid to said cylinder and retract the lifting means.

Of course, I do not wish to be limited to the exact details of construction herein shown and described, as these may be varied within the scope of the appended claims without departing from the spirit of my invention.

Having thus fully described my invention, what I claim as new and useful is:—

1. In a device of the character stated, a vehicle having a power plant provided with a gear wheel, fluid operated lifting means fixed to said vehicle, a cylinder carried by the vehicle, conduits connecting the cylinder with the lifting means, valves in said conduits to control the passage of fluid therethrough, means to operate said valves from a remote location, a piston in the cylinder for causing the fluid to flow from and to said cylinder, a piston rod movable only longitudinally and connected to the piston, a shaft having threaded connection with the piston rod, a main gear on said shaft, a frame pivoted for movement about the axis of said gear, another gear journalled on the frame and meshing with the main gear, an idler gear journalled on said frame and meshing with said main gear, another gear journalled on said frame and meshing with said idler gear, and means for operating said frame to selectively mesh the second or last named gears with the gear wheel of the power plant to actuate the piston in either direction.

2. In a device of the character described, an automobile, lifting means attached to the automobile, a cylinder having controlled communication with the lifting means, a piston in said cylinder to displace any quantity of a fluid in the cylinder sufficient to actuate the lifting means during the outward movement of said piston and by its single inward movement return any previously displaced fluid to the cylinder, and means selectively operable for transmitting motion from the automobile power plant to the piston to move the latter in either direction during a single functioning of the apparatus.

3. In a device of the character described, an automobile, lifting means attached to the automobile, a cylinder having controlled communication with the lifting means and containing a fluid for projection into said lifting means, a piston slidably mounted in the cylinder with the fluid between it and the outer end of the cylinder whereby an outward movement of said piston will displace any quantity of the fluid sufficient to actuate the lifting means and whereby the inward movement of said piston will produce a suction action to return the previously displaced fluid to the cylinder and retract the lifting means, a piston rod movable only longitudinally and connected to the piston, a shaft having threaded connection with the piston rod, and means for selectively rotating said shaft in either direction from the power plant of the automobile to move the piston outward and inward when and as desired.

ROBERT B. LUKER.